United States Patent
Dick (10) Patent No.: US 10,068,700 B2
(45) Date of Patent: Sep. 4, 2018

(54) CONVERTER DEVICE AND COIL ARRANGEMENT FOR A VOLTAGE REGULATOR

(71) Applicant: Technische Hochschule Koeln, Cologne (DE)

(72) Inventor: Christian Dick, Huerth (DE)

(73) Assignee: Technische Hochschule Koeln, Cologne (DE)

( * ) Notice: Subject to any disclaimer, the term of this patent is extended or adjusted under 35 U.S.C. 154(b) by 0 days.

(21) Appl. No.: 15/572,571

(22) PCT Filed: May 11, 2016

(86) PCT No.: PCT/DE2016/100216
§ 371 (c)(1),
(2) Date: Nov. 8, 2017

(87) PCT Pub. No.: WO2016/180406
PCT Pub. Date: Nov. 17, 2016

(65) Prior Publication Data
US 2018/0122565 A1    May 3, 2018

(30) Foreign Application Priority Data

May 11, 2015    (DE) ........................ 10 2015 107 294

(51) Int. Cl.
   *H01F 21/02*      (2006.01)
   *H01F 27/42*      (2006.01)
   (Continued)

(52) U.S. Cl.
   CPC ............... *H01F 27/42* (2013.01); *H01F 1/12* (2013.01); *H01F 27/25* (2013.01); *H01F 27/28* (2013.01); *H02M 1/08* (2013.01)

(58) Field of Classification Search
   CPC .......... H01F 27/42; H01F 21/00; H01F 29/02; H01F 21/12; H01F 29/025
   (Continued)

(56) References Cited

U.S. PATENT DOCUMENTS

| 4,347,469 A | 8/1982 | Dinger | |
|---|---|---|---|
| 2009/0179723 A1* | 7/2009 | Ikriannikov | ............ H01F 17/06 336/200 |

(Continued)

FOREIGN PATENT DOCUMENTS

| DE | 3030225 A1 | 3/1981 |
|---|---|---|
| DE | 10161907 A1 | 6/2003 |

(Continued)

OTHER PUBLICATIONS

International Search Report dated Oct. 21, 2016, in International Application No. PCT/DE2016/100216.

*Primary Examiner* — Nguyen Tran
(74) *Attorney, Agent, or Firm* — Patent Central LLC; Stephan A. Pendorf (57) ABSTRACT

A converter device comprising a converter and a coil arrangement that contains a number of coils. The coil arrangement has a plurality of interconnected coils. Toroidal cores of a soft magnetic nanocrystalline material are associated with each of said coils. A coupling toroidal core (11) is provided with a core opening (12) through which at least two windings (8, 9) of different coils can be guided and mounted. At least the winding of one coil is guided and mounted through a core opening of an individual toroidal core (13, 14). An open/closed-loop control device is provided with a current controller that acts on the coils such that direct current components are compensated by currents flowing through the windings of the coils.

16 Claims, 4 Drawing Sheets

(51) Int. Cl.
*H01F 27/25* (2006.01)
*H02M 1/08* (2006.01)
*H01F 1/12* (2006.01)
*H01F 27/28* (2006.01)

(58) Field of Classification Search
USPC ............... 323/250–251, 261; 363/137, 142, 363/145–147, 172, 180–186
See application file for complete search history.

(56) References Cited

U.S. PATENT DOCUMENTS

| | | | |
|---|---|---|---|
| 2011/0279212 A1 | 11/2011 | Ikriannikov et al. | |
| 2015/0070124 A1 | 3/2015 | Kapoor et al. | |
| 2015/0102678 A1* | 4/2015 | Knoke | H02M 7/797 307/83 |
| 2015/0287512 A1* | 10/2015 | Winkler | H01F 27/24 336/178 |

FOREIGN PATENT DOCUMENTS

| | | |
|---|---|---|
| DE | 102012109420 A1 | 4/2013 |
| DE | 102012206225 A1 | 10/2013 |
| DE | 102013202712 A1 | 8/2014 |

* cited by examiner

CONVERTER DEVICE AND COIL ARRANGEMENT FOR A VOLTAGE REGULATOR

The invention relates to a converter device comprising a converter and a coil arrangement that contains a number of coils.

A coil comprising a low-permeable toroidal strip core, which consists of a soft magnetic nanocrystalline material, is known from DE 10 2012 206 225 A1. One winding of the coil is guided through a core opening of the toroidal strip core. In order to improve the performance of the coil, and in particular reduce the volume of the same, the toroidal strip core of the known coil has regions with different permeability. The toroidal strip core is constructed such that the permeability increases radially outwardly. However, the performance improvement of the known coil comes at the expense of a higher manufacturing outlay, because the coil consists of core rings of different materials.

A manufacturing method for nanocrystalline toroidal strip cores is disclosed in DE 101 61 907 A1.

An isolator circuit for a d.c. motor, by means of which an output signal proportional to an armature voltage of the motor is to be generated, is known from DE 30 30 225 A1. To this end, a transformer is provided, which consists of an internal and an external toroidal core and about which multiple windings are wound. In addition to a primary and a secondary winding, windings are provided, by means of which amplifiers are coupled. The intended result of this is to make the ripple frequency symmetrical and easily filterable, or respectively to control the change-over of a bistable circuit.

An inverter having two DC/DC converters, which can be separately selected for different storage purposes, is known from DE 10 2012 109 420 A9. As a passive switching facility for selecting the one or the other DC/DC converter, the two DC/DC converters are decoupled from one another by means of their own current chokes as well as a joint storage choke.

An object of the present invention is to further develop a converter device as well as a coil arrangement comprising coils provided with toroidal cores such that the performance of the coil is further improved, in particular the intention is to decrease the volume of the coil or respectively save material.

In order to achieve this object, the invention in conjunction with the preamble of Claim 1 is characterized in that the coil arrangement has a plurality of interconnected coils, and toroidal cores consisting of a soft magnetic nanocrystalline material are associated with each of said coils, a coupling toroidal core is provided with a core opening through which at least two windings of different coils can be guided and mounted, at least the winding of one coil is guided and mounted through a core opening of an individual toroidal core, an open/closed-loop control device is provided with a current controller that acts on the coils such that direct current components are compensated by currents flowing through the windings of the coils.

The invention envisages the coupling of at least two different coils or respectively windings, which are interconnected by means of a coupling toroidal core, in particular a coupling toroidal strip core.

The windings of the coils are controlled by means of an open/closed-loop control device such that the direct current components of the current flowing in the opposite direction through a core opening of the coupling toroidal core, in particular of the coupling toroidal strip core, are compensated. If two windings are used, the average current of the two windings is maintained in magnitude at an equal value or respectively within a relatively narrow current intensity band.

Consequently, the invention makes it possible for the soft magnetic core to be free of DC components for the coupling flow. Compared with a single-phase coil arrangement, more than 60% of the core material can be kept free of direct current flows. The multiphase coil arrangement according to the invention is therefore preferably suited to circuits with relatively high direct current components.

According to a preferred embodiment of the invention, the coil arrangement consists of two windings, each of which can be guided and mounted through the core opening of the coupling toroidal core, in particular of the coupling toroidal strip core and, additionally, through a core opening of an individual toroidal core, in particular of an individual toroidal strip core. The two windings are energized in opposite directions with respect to the coupling toroidal core, in particular the coupling toroidal strip core. This produces a relatively simple and symmetrical construction of the coil arrangement. The coil arrangement can have an even or an odd number of windings. It is essential that the currents of the windings are controlled such that their direct current components are superimposed to form a relatively low resulting total current. If the steady component of the first current flowing through a first winding is equal to a steady component of a second current flowing through the second winding, which is oriented in the compensating direction, then the resulting total current is free of steady components. As a result, the maximum amount of material savings can be achieved. However, it is also acceptable if there is a slight asymmetry in the direct current components, wherein the steady component of the first current is preferably equal in magnitude or has a deviation in magnitude of a maximum of 30% with respect to the magnitude of the second current.

According to a further development of the invention, the coupling toroidal core and each individual toroidal core generally have permeabilities which are different from one another. The unsymmetrical or, in special cases, also symmetrical properties with respect to the windings are used for appropriate applications. The construction of the electrical windings does not have to be identical/symmetrical either.

According to a further development of the invention, the windings of the coils can also be arranged and guided through core openings of multiple coupling toroidal cores. As a result, the reluctance of the coupled magnetic flow can be modified. External stray fields can be reduced by associating multiple coupling toroidal cores with each of the windings.

According to a further development of the invention, the coupling toroidal core and the individual toroidal core are wound from a soft magnetic strip and each have an intrinsically homogeneous permeability distribution. As a result, the cores can advantageously be simply manufactured. The material advantageously makes it possible to use coils in a relatively wide frequency range, for example in a frequency range between 100 kHz and 500 kHz. The eddy-current threshold frequency is relatively high due to the low permeability.

According to a further development of the invention, the coupling toroidal strip core and the individual toroidal strip core consist of a nanocrystalline Fe—Cu—Si—B—Nb alloy. The particle size can be 100 nm or less.

According to a further development of the invention, the strip of the coupling toroidal strip core and of the individual toroidal strip core is heat-treated, wherein said strip has been pulled in the longitudinal direction such that the desired permeability of the strip has been adjusted. By applying a tensile stress, the permeability of the material can be advantageously decreased.

According to a further development of the invention, the individual toroidal core is merely associated with one of the two windings. The other winding does not have an individual toroidal core and only extends through the core opening of the coupling toroidal core.

It is furthermore an object of the present invention to further develop a coil arrangement such that the performance of the coil is further improved, in particular the intention is to decrease the volume of the coil or respectively save material.

In order to achieve this object, the invention having the preamble of Claim 10 is characterized in that a coupling toroidal core, in particular of a coupling toroidal strip core, is provided with a core opening through which at least two windings are guided, no individual toroidal core is associated with a first winding, an individual toroidal core, in particular an individual toroidal strip core, is associated with a second winding, and the second winding can be switched in a currentless or current-carrying manner, so that an inductance of the first winding can be modified between a first inductance in which the second winding is open, and a second inductance in which the second winding is current-carrying.

A switchable and discretely adjustable inductance can advantageously be created by the invention. The one winding, which is not guided through the core opening of the individual toroidal core, serves as a load winding, while the other winding, which is guided through the opening of the individual toroidal core, serves as a switching winding. Depending on whether the switching winding is short-circuited or broken, a different inductance is adjusted by means of the coupling toroidal core, which inductance has an impact on a load circuit in which the load winding is located.

Additional advantages of the invention are set out in the additional subordinate claims.

Embodiment examples of the invention will be explained in greater detail below with reference to the drawings, wherein.

A coil arrangement according to the invention is preferably used in electronic control units, preferably in voltage regulator circuits. The coil arrangement is preferably used to provide ferrite-based supply voltages (point of load or respectively voltage regulator module) for the small power range. This results in large material savings as well as a high regulating bandwidth.

Figure 1:
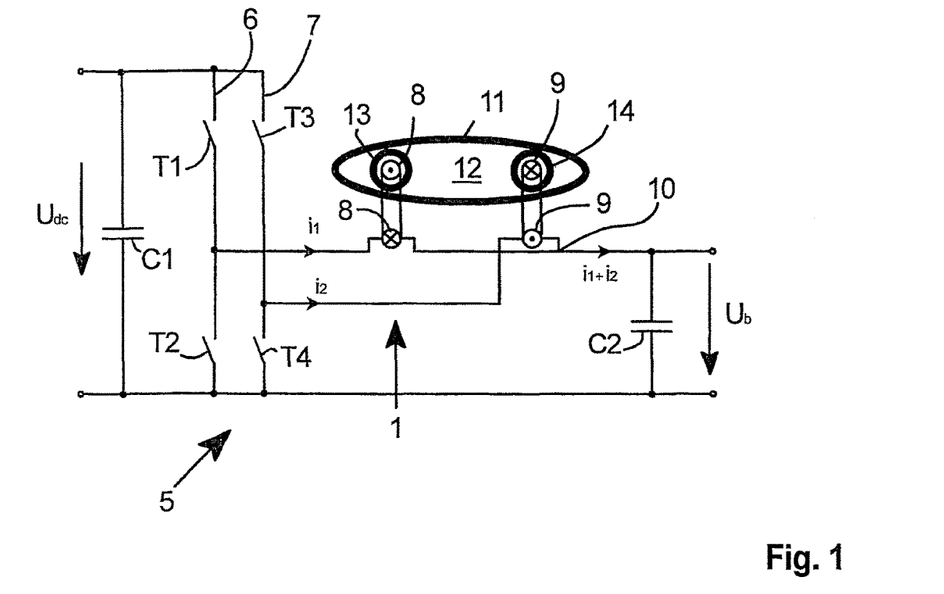
FIG. 1 shows a voltage regulator circuit having an integrated coil arrangement according to the invention.

According to a preferred embodiment in accordance with FIG. 1, a coil arrangement 1 is arranged and integrated in a voltage regulator 5 (voltage regulator circuit). The coil arrangement 1 has toroidal cores. The voltage regulator 5 makes it possible to reduce the direct voltage $U_{dc}$ present at a first capacitor C1 to a lower voltage $U_b$, which is present at an output-side capacitor C2. For example, the output voltage $U_b$ can be 2 volts. Since the iron-based alloys are able to withstand a significantly greater load, significantly increased powers are transferred in another preferred embodiment. Accordingly, the output voltage $U_b$ can be, for example, 50 volts.

FIG. 1 shows a voltage regulator circuit 5 (direct voltage converter), which has a first switching leg 6 which runs parallel to the input capacitor C1 and which contains the transistors T1 and T2, as well as a second switching leg 7 which runs parallel to the input capacitor C1 and which contains transistors T3 and T4. A first winding 8 of the coil arrangement 1 is joined between the transistors T1 and T2 of the first leg 6, wherein a current $i_1$ flows by means of the first winding 8 to the output capacitor C2. A second winding 9 of the coil arrangement 1 is joined between the third transistor T3 and the fourth transistor T4 of the second leg 7, wherein a current $i_2$ flows to the output capacitor C2. First connection points of the first winding 8 and of the second winding 9 are located in the first switching leg 6 between the transistors T1 and T2 or respectively in the second switching leg 8 between the transistor T3 and T4. Second connections of the first winding 8 and of the second winding 9 are located at a joint connection point 10, so that a summation current $i_1+i_2$ is routed from the current $i_1$ flowing through the first winding 8 and the second current $i_2$ flowing through the second winding 9 to the output capacitor C2.

The first winding 8 and the second winding 9 are interconnected by means of a coupling toroidal core configured as a coupling toroidal strip core 11. For this purpose, the first winding 8 and the second winding 9 run through a joint core opening 12 of the coupling toroidal strip core 11.

An individual toroidal core configured as a first individual toroidal strip core 13 is associated with the first winding 8, and an individual toroidal core configured as a second individual toroidal strip core 14 is associated with the second winding 9. A core opening of the first individual toroidal strip core 13 and of the second individual toroidal strip core 14 runs inside the core opening 12 of the coupling toroidal strip core 11.

An open/closed-loop control device, which is not shown, controls the switching transistors T1, T2, T3, T4 such that a coupling flow $\Phi_k$ is free of direct current flows. The direction of the currents $i_1$ and $i_2$ of the two windings 8 and 9 is drawn in, in opposite directions, in FIG. 1 (see dot/cross representation). To ensure that, compared with the first winding 8, an opposite current $i_2$ runs through the second winding 9, the transistors T1 and T4 or respectively T2 and T3 can be switched through alternately.

Figure 2:
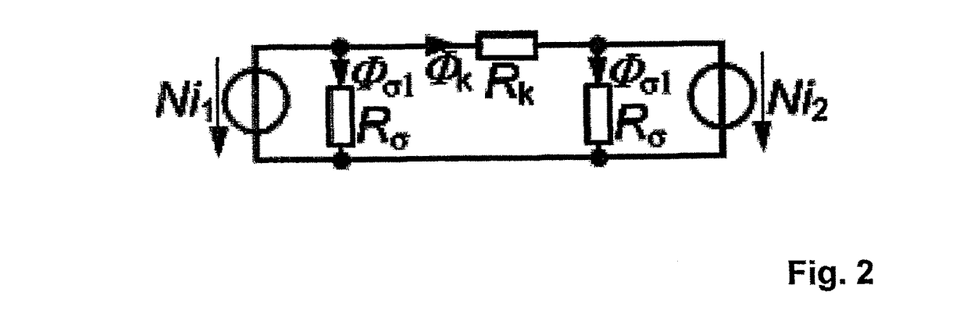
FIG. 2 shows a magnetic equivalent circuit diagram of the coil arrangement.

The first winding 8 and the second winding 9 can have a plurality of N windings. Leakage reluctances $R_\sigma$ are produced by means of the individual toroidal strip cores 13, 14. A coupling reluctance $R_K$, which does not have a steady component for symmetrical currents $i_1$, $i_2$, is produced by means of the coupling toroidal strip core 11. An appropriate magnetic equivalent circuit diagram of the coil arrangement 1 is shown in FIG. 2.

Due to the coupling according to the invention of at least two windings 8, 9, the currents $i_1$, $i_2$ of which are controlled such that direct current components of the currents $i_1$, $i_2$ are compensated or respectively are compensated except for a small direct current component, more than 60% of the core material can be kept free of direct current flows. This has a particularly positive effect on circuits with high direct current components. The current $i_1$ flowing through the first winding 8 and the current $i_2$ flowing through the second winding 9 are maintained at approximately the same average amount of current by means of the open/closed-loop control device. Since the currents $i_1$ and $i_2$ flow in opposite directions, the direct current components of the currents $i_1$ and $i_2$ are compensated. The soft magnetic core 11 for the magnetic coupling flow is free of magnetic direct current flows.

The coupling toroidal strip core 11 as well as the individual toroidal strip cores 13, 14 preferably consist of a nanocrystalline Fe—Cu—Si—B—Nb alloy. The coupling toroidal strip core 11 as well as the individual toroidal strip cores 13, 14 consist of a heat-treated strip which has been pulled in the longitudinal direction such that the desired permeability of the strip or respectively of the coupling toroidal strip core 11 and of the individual toroidal strip cores 13, 14 can be adjusted by means of the tractive force. The strips are each continuously introduced into a continuous annealing system and processed by the latter to produce soft magnetic material. The coupling toroidal strip core 11 as well as the individual toroidal strip cores 13, 14 consist of a wound soft magnetic strip which has a homogeneous permeability distribution. In particular, the permeability runs constantly in the radial direction. Due to the material property, an independence of frequency of the permeability is advantageously produced, so that the coil arrangement can be used in a frequency range between 100 kHz and 500 kHz. Investigations have revealed that the losses can be improved by a factor of five compared with a ferrite material 3C96, wherein the saturation flux density can simultaneously be increased by a factor of three.

Figure 3:
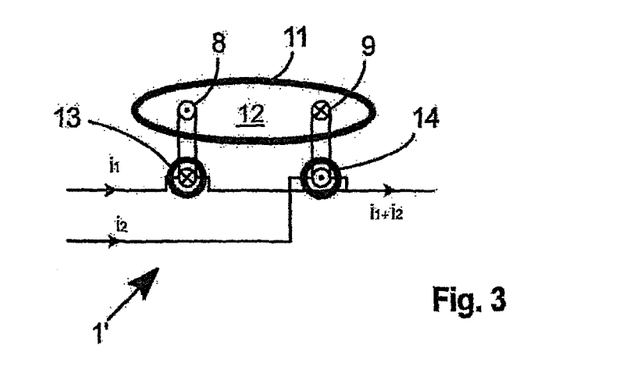
FIG. 3 shows a coil arrangement according to a second embodiment.

According to a second embodiment of the invention, a coil arrangement 1' is provided in FIG. 3, which differs from the first embodiment of the invention shown in FIG. 1 in that an individual toroidal strip core 13 associated with the first winding 8 and a second individual toroidal strip core 14 associated with the second winding 9 are arranged outside the core opening 12 of the coupling toroidal strip core 11. With respect to the magnetic coupling effect between the first winding 8 and the second winding 9, this embodiment is identical to the embodiment according to FIG. 1. Thanks to the locally separate arrangement of the individual toroidal strip cores 13, 14 with respect to the coupling toroidal strip core 11, the coil arrangement 1' has a simple construction which is easier to produce.

Figure 4:
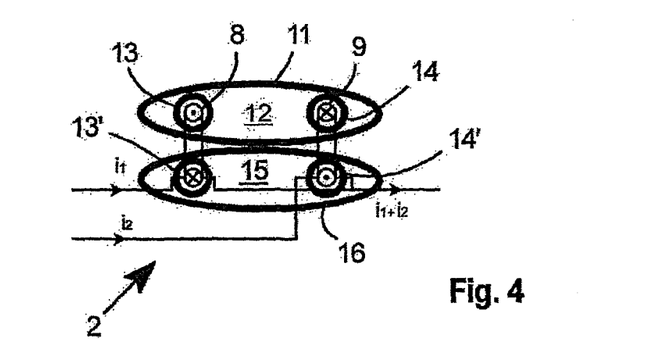
FIG. 4 shows a coil arrangement according to a third embodiment.

According to a third embodiment of the invention, a coil arrangement 2 is shown in FIG. 4, in which in contrast to the first embodiment according to FIG. 1, the first winding 8 and the second winding 9 of the first coil arrangement 1 are additionally guided through a further core opening 15 of a second coupling toroidal strip core 16. If necessary, further coupling toroidal strip cores 15 can be provided in order to couple the first winding 8 to the second winding 9. Another difference with respect to the coil arrangement 1 is that at least two individual toroidal strip cores 13, 13' or respectively 14, 14' are associated with both the first winding 8 and the second winding 9. As a result, the leakage reluctance $R_\sigma$ of the two windings 8, 9 can be modified accordingly.

The same components or respectively component functions of the embodiment examples are provided with the same reference numerals.

The second coil arrangement 2 makes possible a stronger coupling between the first winding 8 and the second winding 9, which results in a reduced coupling reluctance $R_K$.

Figure 5:
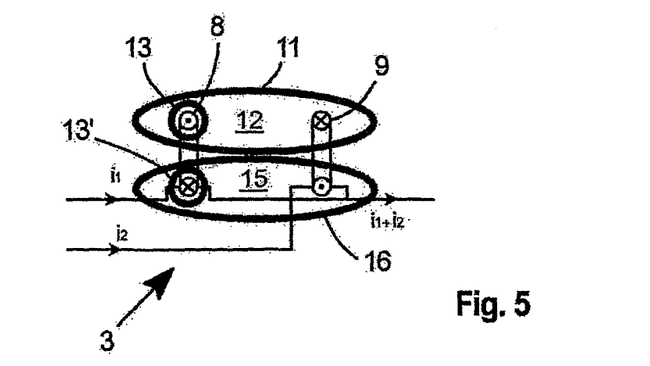
FIG. 5 shows a coil arrangement according to a fourth embodiment.

According to another embodiment of the invention, a fourth coil arrangement 3 is provided in accordance with FIG. 5, in which only the first winding 8 is provided with a first individual toroidal strip core 13 or respectively 13', while the second winding 9 is not provided with an individual toroidal strip core. This therefore produces an unsymmetrical distribution of the leakage reluctances $R_\sigma$.

According to another embodiment of the invention, a coil arrangement 1 or respectively 2 is provided in accordance with FIG. 1 or respectively 3, in which the individual toroidal strip cores in particular have different permeabilities, which likewise results in an unsymmetrical distribution of the leakage reluctances $R_\sigma$.

Figure 6:
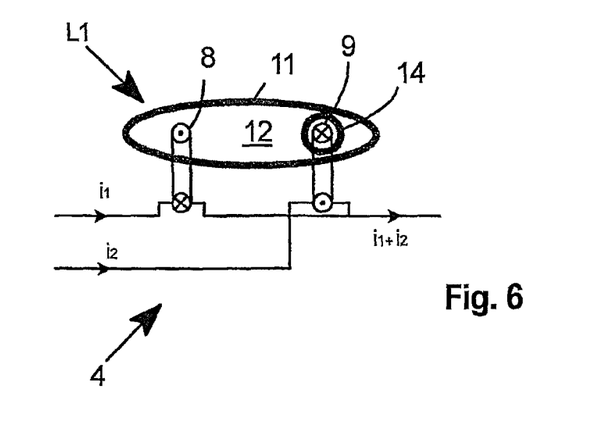
FIG. 6 shows a coil arrangement according to a fifth embodiment.

According to another embodiment of the invention, a coil arrangement 4 is provided in accordance with FIG. 6, by means of which an inductance L1 of the current $i_1$ flowing through the first winding 8 can be controlled. The first winding 8 is coupled by means of the coupling toroidal strip core 11 to the second winding 9. The individual toroidal strip core 14 is merely associated with the second winding 9. The first winding 8 does not have an individual toroidal strip core.

If the second winding 9 is open, the first winding 8 has an output inductance. If the second winding 9 is short-circuited, wherein the second individual core toroidal strip 14 is low-permeable, the second winding 9 then guides an energy-storing magnetic flow which results in a modified inductance L1 of the first winding 8. Due to the two switching states of the second winding 9, this results in the adjustment of two different inductances for the first winding 8. The first winding 8 is located in the load circuit. The second winding 9 is located in a switching circuit.

In particular, the invention makes possible, due to the geometric arrangement of toroidal strip cores 11, 13, 13', 14, 14' with respect to the first winding 8 and the second winding 9, a compensation of steady components of the magnetic flows of the first winding 8 and of the second winding 9.

According to an embodiment, which is not shown, more than two windings, for example three, four windings, can also be provided. According to the invention, the windings are controlled such that steady components of the currents flowing through them are compensated.

Figure 7:
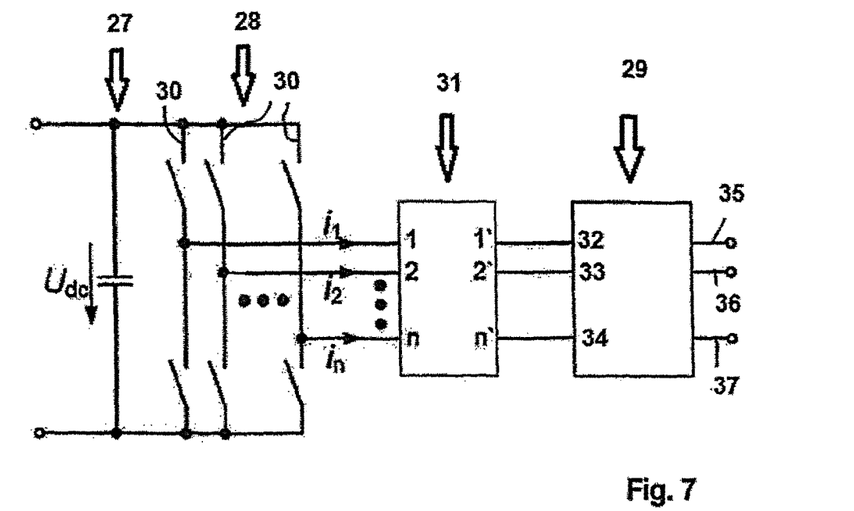
FIG. 7 shows a schematic representation of an alternative converter device.

According to another embodiment of the invention in accordance with FIG. 7, a multiphase (n-phase) converter device is provided, which has an intermediate voltage circuit (capacitor) 27, a converter 28, a filter 29 (for example, containing filter capacitors, possibly with feedback to the intermediate circuit) as well as a coil arrangement 31. The coil arrangement 31 differs from the coil arrangement 1 according to FIG. 1 in that it not only has two windings, but multiple windings, a number of windings corresponding to the legs 30 of the converter 28. The coil arrangement 31 therefore has n windings. Another difference of the coil arrangement 31 with respect to the coil arrangement 1 shown in FIG. 1 is that the coil of the coil arrangement 31 is not merged to a same connection point 10, i.e. not guided up to the same potential point. Instead, second connections 1', 2', n' of the coils are connected separately to connections 32, 33, 34 of the subordinate unit, namely of the filter 29. It is assumed in the present embodiment example that this entails a three-phase converter device or respectively converter 28. On the load side, the filter 29 is connected by means of connections 35, 36, 37 to a load, for example to a network (automotive network). The coil arrangement 31 is arranged between the converter 28 and the filter 29. An intermediate voltage circuit having an intermediate circuit voltage is formed between the converter 28 and the coil arrangement 31, which intermediate circuit voltage is preferably present in phases at the input side of the coil arrangement 31.

Figure 8:
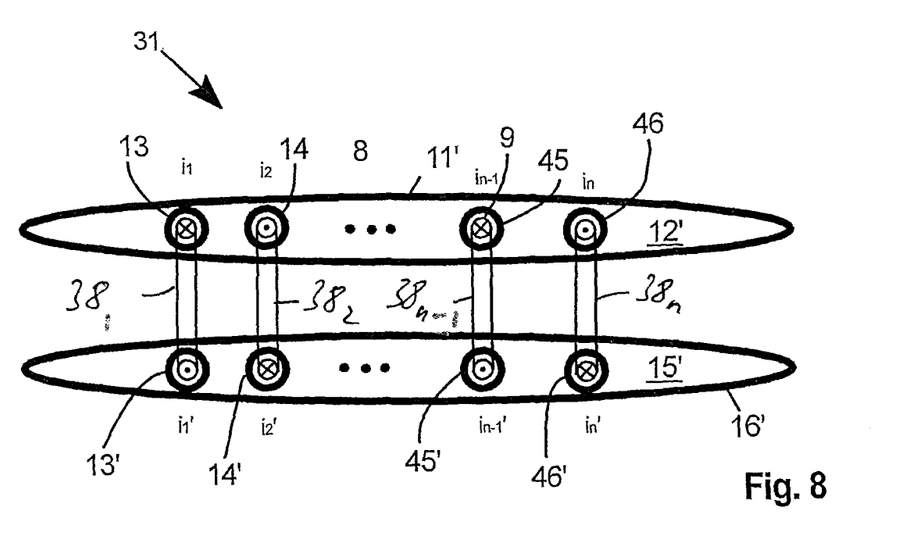
FIG. 8 shows a coil arrangement according to the embodiment in accordance with FIG. 7.

As can be seen from FIG. 8, the coil arrangement 31 can have windings $38_1$, $38_2$, $38_{n-1}$, $38_n$, which are arranged and guided, on the one hand, through a joint core opening 12' of a first coupling toroidal strip core 11' and through a second core opening 15 of a second coupling toroidal strip core 16'. Additionally, the windings $38_1$, $38_2$, $38_{n-1}$, $38_n$ each have individual toroidal strip cores 13, 13' or respectively 14, 14' or respectively 45, 45', 46, 46', wherein the respective first individual toroidal strip cores 13, 14, 45, 46 run inside the first coupling toroidal strip core 11' and the second individual toroidal strip cores 13', 14', 45', 46' run inside the second coupling toroidal strip core 16'.

The converter device has an open/closed-loop control device (not shown) having a current controller, which acts on the coils having the windings $38_1$, $38_2$, $38_{n-1}$, $38_n$ such that direct current components are compensated by currents $i_1$, $i_2$, $i_{n-1}$, $i_n$ flowing through the windings $38_1$, $38_2$, $38_{n-1}$, $38_n$ of the coils or respectively become zero or have a relatively small value or a small value compared with a nominal current.

For example, the currents of the coils can, on average, be adjusted to a similar level. In the present embodiment example according to FIG. 7, an intermediate circuit voltage $U_{dc}$ of the intermediate voltage circuit 27 can be adjusted, for example. The following can apply, for example, to the coil currents:

$i_1 = i_2 = \ldots = i_n$ and, indeed, to a converter device which is configured as a d.c. voltage transformer (DC/DC converter). In this case it is assumed that the number n of the legs 30 or respectively of the currents $i_1, i_2 \ldots i_n$ is an even number.

According to an embodiment of the invention, which is not shown, a converter device can be provided, in which the sum of the currents $i_1, i_2 \ldots i_n$ is equal to zero or close to zero or respectively is small compared with the nominal current. It can be a converter device, for example, for a three-phase power supply. In the case of this embodiment, which is not shown, the currents (e.g. the three phase currents) would, in contrast to FIG. 8, be guided in the same direction through the coupling toroidal strip core (11' and/or 16').

According to an alternative embodiment of the invention (which is not shown), the coil arrangement can be used in a converter device which has an intermediate current circuit (with current source), wherein an intermediate circuit current is impressed by means of the coil arrangement.

Alternatively, the coil arrangement can be used in a converter device which is configured as a Z-source converter device (ZSI), which has a number of coils and capacitors so that the properties of a current source converter device (CSI) and a voltage source converter device (VSI) are combined.

It is understood that the coil arrangement 31 can have a coupling of the individual windings shown in FIGS. 1 to 5. In particular, the configuration of the coil arrangement 31 can be such that the number of the coils is greater than two, but otherwise corresponds to the configuration according to FIGS. 1 to 5, in particular the currents are merged at a connection point on an output side of the coil arrangement 31. In an alternative embodiment these currents are not merged—as shown in FIG. 7.

According to alternative embodiments of the invention, instead of the individual toroidal strip cores and coupling toroidal strip cores, individual and coupling toroidal cores can also be provided, which are each produced by pressing powder at a high temperature into an annular mold (powder composite material). During this, the individual and coupling toroidal cores are sintered at a high temperature to form a ceramic.

It is understood that the described converter devices or respectively the coil arrangements can be used bidirectionally.

The invention claimed is:

1. A converter device comprising a converter and a coil arrangement (1, 2, 3, 4, 31) that contains a number of coils, wherein
   the coil arrangement (1, 2, 3, 4, 31) has a plurality of interconnected coils, and wherein toroidal cores consisting of a soft magnetic material are associated with each of said coils,
   a coupling toroidal core (11, 11', 16, 16') is provided with a core opening (12, 12', 16, 16') through which at least two windings (8, 9, $38_1$, $38_2$, $38_{n-1}$, $38_n$) of different coils can be guided and mounted,
   at least the winding (8, 9) of one coil is guided and mounted through a core opening of an individual toroidal core (13, 14), and
   an open/closed-loop control device is provided with a current controller that acts on the coils such that direct current components are compensated by currents (i1, i2 … $i_n$) flowing through the windings (8, 9) of the coils.

2. The converter device according to claim 1, wherein the coil arrangement (1, 2, 3, 4, 31) is connected on the load side or on the line side of a converter (28) and wherein the converter (28) is configured as a rectifier or as an inverter.

3. The converter device according to claim 1, wherein the converter device has a multiphase configuration and an intermediate voltage circuit (27) to which the coil arrangement (31) is connected on the load side, and wherein load-side connections of the coils are connected separately to different connections (32, 33, 34) of a subordinate unit (29) of the converter device.

4. The converter device according to claim 1, wherein the coil arrangement (1, 2, 3, 4, 31) is integrated in a converter device having an intermediate current circuit or in a Z-source converter device.

5. A coil arrangement for voltage regulator circuits (5), comprising a coil that contains a toroidal core (11) consisting of a soft magnetic nanocrystalline material and a winding (8, 9) which is guided and arranged through a core opening (12) of the toroidal core (11), wherein a coupling toroidal core (11) is provided with a core opening (12) through which at least two windings (8, 9) of different coils can be guided and mounted, at least one winding (8, 9) is guided and mounted through a core opening of an individual toroidal core (13, 14), and an open/closed-loop control device is provided, by means of which electric currents ($i_1$, $i_2$) flowing through the windings (8, 9) are acted on such that direct current components of the currents ($i_1$, $i_2$) are compensated.

6. The coil arrangement according to claim 5, wherein a first winding (8) and a second winding (9) can be guided and mounted through the core opening (12) of each associated individual toroidal core (13, 14), and the steady component of the first current ($i_1$) flowing through the first winding (8) is equal in magnitude or has a deviation in magnitude of a maximum of 30% and flows in the opposite direction with respect to the second current ($i_2$) flowing through the second winding (9).

7. The coil arrangement according to claim 5, wherein the first winding (8) and the second winding (9) are arranged in a joint core opening (12) of multiple coupling toroidal cores (11).

8. The coil arrangement according to claim 5, wherein only the first winding (8) is arranged in the core opening (12) of the individual toroidal core (13).

9. The coil arrangement according to claim 5, wherein the first winding (8) as a first coil on a first switching leg (6), the second winding (9) as a second coil on a second switching leg (7) of a voltage regulator circuit and, in each case, another connection of the first winding (8) and of the second winding (9) are interconnected.

10. The coil arrangement according to claim 5, wherein the first winding (8) and the second winding (9) are each joined between switches (T1, T2, T3, T4) of the switching legs (6, 7).

11. The coil arrangement according to claim 5, wherein the coupling toroidal core (11) and the individual toroidal core (13, 14) are wound from a soft magnetic strip and have an intrinsically homogeneous permeability distribution.

12. The coil arrangement according to claim 5, wherein the coupling toroidal strip core (11) and the individual toroidal strip core (13, 14) consist of a nanocrystalline iron-based (e.g. Fe—Cu—Si—B—Nb) alloy.

13. The coil arrangement according to claim 5, wherein the strip of the coupling toroidal strip core (11) and of the individual toroidal strip core (12) is heat-treated, wherein such a tractive force acts in the longitudinal direction that the desired permeability of the strip is adjusted.

14. A coil arrangement comprising a coil that contains a toroidal core consisting of a soft magnetic nanocrystalline material and a winding which is guided and arranged through a core opening of the toroidal core, wherein a coupling toroidal core (11) is provided with a core opening (12) through which at least two windings (8, 9) are guided, no individual toroidal core is associated with a first winding (8), an individual toroidal core (14) is associated with a second winding (9), and wherein the second winding (9) can be switched in a currentless or current-carrying manner, so that an inductance (L1) of the first winding (8) can be modified between a first inductance in which the second winding (9) is open, and a second inductance in which the second winding (9) is current-carrying.

15. The coil arrangement according to claim 5, wherein the nanocrystalline coupling toroidal strip core and/or the individual toroidal strip core (11, 11', 16, 16') has/have a relative permeability $\mu_r$ of less than 100.

16. The converter device according to claim 1, wherein said soft magnetic material is nanocrystalline material.

* * * * *